(12) United States Patent
Redmer

(10) Patent No.: US 8,570,590 B2
(45) Date of Patent: Oct. 29, 2013

(54) METHOD AND INSTALLATION FOR PRINTING DIFFERENT BLANKS ON A PRINTED SHEET AND COLORING BEHAVIOR REMAINS AS CONSTANT AS POSSIBLE EVEN IN THE CASE OF BLANKS COMBINED DIFFERENTLY WITH ONE ANOTHER

(75) Inventor: Eberhard Redmer, Ascheberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 866 days.

(21) Appl. No.: 12/545,111

(22) Filed: Aug. 21, 2009

(65) Prior Publication Data

US 2010/0085588 A1   Apr. 8, 2010

(30) Foreign Application Priority Data

Aug. 21, 2008   (DE) .......................... 10 2008 038 608

(51) Int. Cl.
| | | |
|---|---|---|
| G06F 3/12 | (2006.01) |
| H04N 1/00 | (2006.01) |
| H04N 1/60 | (2006.01) |
| G03F 3/08 | (2006.01) |
| B31F 1/07 | (2006.01) |
| B41F 17/00 | (2006.01) |
| B41J 1/16 | (2006.01) |
| B41J 27/00 | (2006.01) |

(52) U.S. Cl.
USPC ............ 358/1.9; 358/1.15; 358/1.6; 358/518; 101/4; 101/35; 101/93.17; 101/103

(58) Field of Classification Search
USPC .......... 358/1.9, 1.15, 1.18, 1.1, 1.6, 530, 523, 358/526, 534, 502, 501, 504, 518; 347/100, 347/5, 6, 19, 20, 24, 23, 37, 43, 71, 74, 103, 347/110, 112, 115, 116, 117, 120, 172, 188, 347/217; 101/4, 5, 17, 35, 36, 75, 93.07, 101/93.08, 103, 32, 492, 350.1, 483, 171

See application file for complete search history.

(56) References Cited

U.S. PATENT DOCUMENTS

| 2,006 | A | * | 3/1841 | Read ............................. 12/119.5 |
| 4,390,958 | A | * | 6/1983 | Mamberer ................. 101/350.1 |

(Continued)

FOREIGN PATENT DOCUMENTS

| DE | 3527500 A1 | 4/1986 |
| DE | 19525186 A1 | 1/1997 |

(Continued)

OTHER PUBLICATIONS

ABDICK 9985, Two Tower Offset Press, Sep. 2006, Presstek, ABDICK 9985, all pages.*

(Continued)

Primary Examiner — Ngon Nguyen
(74) Attorney, Agent, or Firm — Laurence A. Greenberg; Werner H. Stemer; Ralph E. Locher

(57) ABSTRACT

A method for printing combined jobs having different blanks on a printed sheet includes obtaining area coverage values or inking zone presetting values for printing presses, with which the blanks are printed, from image data of the printed sheet. The area coverage values from an earlier job are compared with those from a subsequent job, in which the number, the configuration or the type of at least one blank differs from the corresponding value from the earlier job. The configuration of the blanks on the sheet is changed if the difference in the area coverages exceeds predefined values. An installation for carrying out the method is also provided.

13 Claims, 6 Drawing Sheets

(56) References Cited

U.S. PATENT DOCUMENTS

| | | | |
|---|---|---|---|
| 4,649,500 A | 3/1987 | Yamada et al. | |
| 4,947,746 A * | 8/1990 | Jeschke et al. | 101/211 |
| 4,975,862 A * | 12/1990 | Keller et al. | 382/112 |
| 5,128,879 A * | 7/1992 | Greve et al. | 382/112 |
| 5,841,955 A * | 11/1998 | Wang | 358/1.9 |
| 5,884,451 A * | 3/1999 | Kano et al. | 53/411 |
| 5,965,227 A * | 10/1999 | Focke | 428/43 |
| 6,742,451 B1 | 6/2004 | Junghans | |
| 7,283,276 B2 * | 10/2007 | Tacke | 358/1.18 |
| 7,313,893 B2 | 1/2008 | Voegele, Jr. | |
| 7,481,165 B2 * | 1/2009 | Weichmann | 101/484 |
| 7,599,088 B2 * | 10/2009 | Bru | 358/1.18 |
| 2002/0022560 A1 * | 2/2002 | Zoeckler et al. | 493/343 |
| 2003/0005841 A1 * | 1/2003 | Riepenhoff | 101/484 |
| 2003/0090725 A1 * | 5/2003 | Bronstein et al. | 358/1.18 |
| 2003/0111521 A1 * | 6/2003 | Holmes | 229/117 |
| 2003/0136288 A1 * | 7/2003 | Bestmann et al. | 101/484 |
| 2003/0150773 A1 * | 8/2003 | Dennis et al. | 206/767 |
| 2005/0005791 A1 | 1/2005 | Shiki | |
| 2006/0001690 A1 * | 1/2006 | Martinez et al. | 347/19 |
| 2006/0251299 A1 * | 11/2006 | Kinjo | 382/118 |
| 2008/0087184 A1 * | 4/2008 | Kerz | 101/483 |
| 2008/0198189 A1 * | 8/2008 | Vanhooydonck et al. | 347/9 |

FOREIGN PATENT DOCUMENTS

| | | |
|---|---|---|
| DE | 10028317 A1 | 12/2000 |
| DE | 10100851 A1 | 7/2002 |
| DE | 102004032480 A1 | 2/2005 |
| DE | 102006003554 A1 | 7/2007 |
| DE | 102007047086 A1 | 4/2008 |

OTHER PUBLICATIONS

German Search Report dated Apr. 30, 2009.

* cited by examiner

METHOD AND INSTALLATION FOR PRINTING DIFFERENT BLANKS ON A PRINTED SHEET AND COLORING BEHAVIOR REMAINS AS CONSTANT AS POSSIBLE EVEN IN THE CASE OF BLANKS COMBINED DIFFERENTLY WITH ONE ANOTHER

CROSS-REFERENCE TO RELATED APPLICATION

This application claims the priority, under 35 U.S.C. §119, of German Patent Application DE 10 2008 038 608.1, filed Aug. 21, 2008; the prior application is herewith incorporated by reference in its entirety.

BACKGROUND OF THE INVENTION

Field of the Invention

The invention relates to a method and an installation for printing different blanks on a printed sheet.

When printing packaging, as a rule a plurality of blanks for labels or folding boxes is printed on a sheet. In that case, use is frequently also made of combined printing forms, in which blanks for different folding boxes or labels are disposed on a sheet, be it in order to utilize the sheet better in that way and to produce less trim or in order to increase the number of sheets which can be printed in one pass. It is also known to store the data from such combined printing forms that are relevant for the print job and, during a repeat job, to use those data for presetting the printing press, for example for presetting the inking zone openings.

In some cases, however, the original assembly of the different blanks for the printed sheet cannot be maintained. If, for example, not all the blanks but only some specific blanks from an old job are to be reprinted but other, new blanks are needed therefor, new printing plates have to be exposed, with which the newly assembled different blanks are then produced.

In that case, it is also inevitable that the blanks newly combined with one another also require different inking because of the different image content or pick up more or less ink in the individual inking zones of the printing units than in the stored job. Now, in such a case, although the inking zone openings will be recalculated from the image data of the new job, the problem arises that, due to the changed inking zone openings, the coloring of the maintained "old" blanks will no longer exactly be achieved.

When printing packaging, however, the printed blanks must achieve their respective archived original pattern very accurately. That is because when folding boxes of the same type from different production runs meet one another in the same rack during merchandising, color differences are immediately striking and give rise to the impression of reduced quality because of the non-uniform coloring.

For that reason, on one hand, attempts are made as far as possible in a production run to produce pure forms having only one blank and if possible to avoid combined printing forms. On the other hand, the advantages of combined printing forms mentioned at the beginning cannot be used.

German Published, Non-Prosecuted Patent Application DE 35 27 500 A1, corresponding to U.S. Pat. No. 4,649,500, discloses the practice, for the different image elements to be disposed on one page or one sheet, of determining and storing ink demand quantities as averages of area coverage values in the halftone image of the image elements. However, the problem of coloring changes when printing combined jobs is not addressed in that text.

SUMMARY OF THE INVENTION

It is accordingly an object of the invention to provide a method and an installation for printing different blanks on a printed sheet, which overcome the hereinafore-mentioned disadvantages of the heretofore-known methods and installations of this general type and through the use of which, as early as during preparation of a print or during production of a printing plate in a pre-press stage, coloring behavior remains as constant as possible, even in the case of blanks combined differently with one another.

With the foregoing and other objects in view there is provided, in accordance with the invention, a method for printing combined jobs having different blanks on a printed sheet. The method comprises obtaining area coverage values or inking zone presetting values for printing presses, with which the blanks are printed, from image data of the printed sheet, comparing the area coverage values or inking zone presetting values from an earlier job with those from a subsequent job, in which a number, configuration or type of at least one blank differs from a corresponding value from the earlier job, and changing the configuration of the blanks on the sheet, if a difference in the area coverage values or inking zone presetting values exceeds predefined values.

With the objects of the invention in view, there is concomitantly provided an installation for printing combined jobs having different blanks on a printed sheet to carry out the method according to the invention. The installation comprises a computer or workstation for processing image data, a program for determining area coverage values or inking zone presetting values from the image data, a comparison device for comparing area coverage values or inking zone presetting values of different combined jobs in color separations of the printed sheet with one another, and an expert system for optimizing a geometric configuration of the blanks of the combined job on the sheet.

According to the invention, the area coverage values of the sheet from an earlier job are compared with those of a subsequent job having to some extent different mixed blanks, before the printing plate is produced for the "partial" repeat job. In this way, by using the comparison in accordance with predefined criteria, it is possible to derive a statement as to whether and/or to what extent the blanks printed therewith will differ in their coloring from the stored original. On the basis of this statement, the blanks can then either be disposed geometrically differently in relation to one another or the ratio of their quantities can be changed. Furthermore, it is also possible to derive the recommendation to dispense with the desired combination of blanks entirely and instead to print, together with the "old" blanks, blanks of a different type which fit better in terms of color.

It is advantageous if, for each individual blank on the sheet, the calculation of the ink demand or the necessary inking zone opening is carried out and stored together with the respective geometric data. In this case, it is particularly expedient if the coverage data is calculated and stored in a finer-mesh network than the inking zone itself, expediently in a network having grid squares of which the length is below the value for the width of an inking zone approximately by a factor of 10 to 100.

According to the invention, the color deviations in repeat jobs with mixed blanks are already detected during the sheet impositioning within the prepress stage, which means before the printing plate is exposed. This offers the possibility of optimizing the production of the printing plate, for example by quality indicators being derived from the comparison of the area coverage values or by an automated process being started, in which geometrically different quantity relationships and configurations of the blanks, in which the area coverages within the inking zones lie optimally around the values stored for the original, are suggested to the operator. In the course of this automation, it is further expedient to select a series of different blanks from a database and to calculate optimized configurations from the area coverage values therefor, the blanks which fit best with one another or are most closely suitable to be printed together on a combined printing form being suggested to the user.

Other features which are considered as characteristic for the invention are set forth in the appended claims.

Although the invention is illustrated and described herein as embodied in a method and an installation for printing different blanks on a printed sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2A:
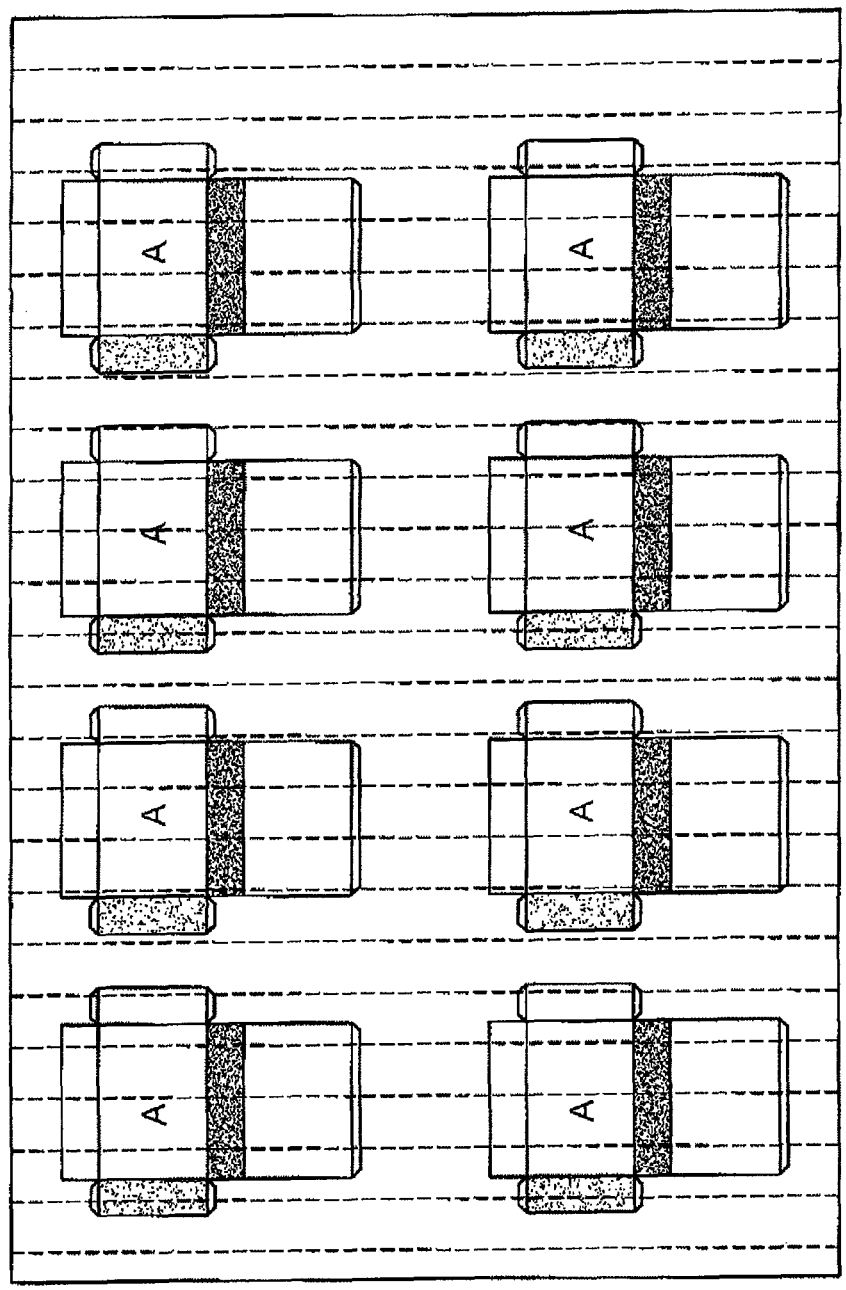
FIGS. 2A and 2B are plan views of sheets printed according to the invention.
Figure 2B:
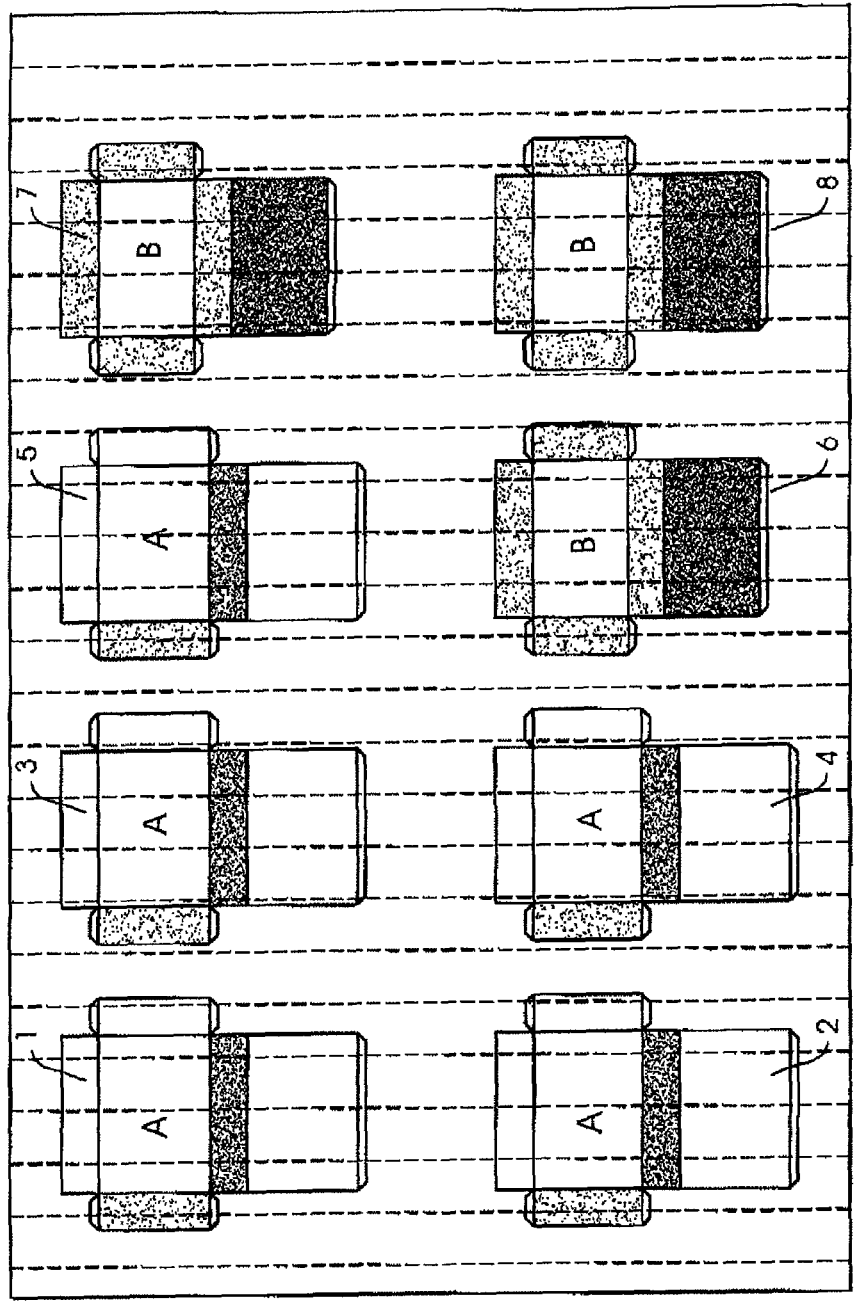

Referring now to the figures of the drawings in detail and first, particularly, to FIGS. 2A and 2B thereof, there is seen a printed sheet which contains folding boxes to be punched out, two folding boxes of different types, namely A and B, in each case being applied thereto in a plurality of blanks. FIG. 2B shows a subsequent job to the extent that, for the folding box of type A, one or more print jobs have already been carried out, therefore in the case of this printed sheet it is a subsequent job in relation to the blank A, while the folding boxes of type B are to be printed for the first time on the printed sheet together with those of type A.

The printed sheet of the preceding job, which for example contains only folding boxes of type A, is illustrated in FIG. 2A.

For each of the eight individual blanks on the sheet 1 according to FIG. 2A, a fine-mesh calculation of the area coverage has been carried out. To this end, a grid having squares of about 4 mm$^2$ in size has been placed over the blanks and the ink demand for the individual color separations YMCK has been calculated from the image data from the prepress stage and stored, together with the co-ordinates of the grid squares, as a blank-dependent distribution of the area coverage values or as a distribution of the area coverage values which is characteristic of the blanks.

Following the impositioning of the eight blanks, for the, for example, 24 or 32 inking zones of the press with which the sheets are to be printed, the area coverage values of the squares within each inking zone strip are integrated, which means that the inking zone setting values are calculated and in addition the total ink demand for the sheet in the individual color separations is determined and stored together with the setting values for the inking zones. The result of the integration is illustrated at the top in FIG. 3A. Below this, histograms of the area coverage of the individual blanks are illustrated together with their position relative to the inking zones of the press. Since the blanks to some extent project to different extents into the inking zones, the resultant inking zone opening of the pairs of blanks is also different.

In addition, the geometric position of the eight individual blanks on the sheet has been stored. This data has likewise been archived for repeat jobs, like other data useful for a repeat job, such as the configuration for the screening of the halftone data, the use of special inks, etc.

During the impositioning of the sheet for the repeat job according to FIG. 2B, which now, besides the original blanks of type A, also contains those of type B, at first the procedure is the same, i.e. for this sheet of the second layout, the total value of the area coverage and the area coverage within the individual inking zones is also calculated for the individual color separations. In addition, for the blanks of type B, the area coverage values together with the coordinates of the screen cells have also been stored in a grid of 4 mm$^2$. The corresponding illustration will be found in FIG. 3B.

Figure 3A:
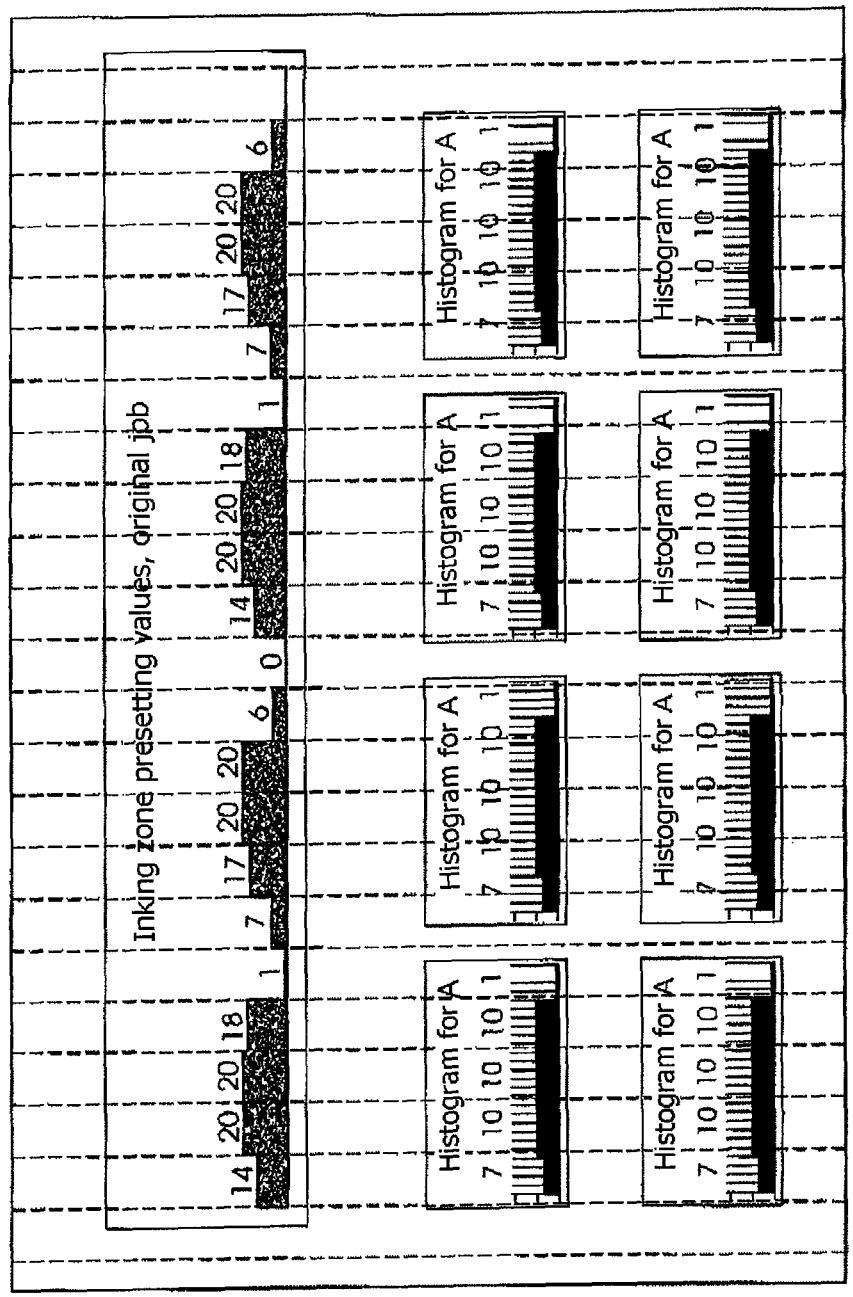
FIGS. 3A and 3B include graphical illustrations of inking zone presetting values in respective original and subsequent jobs, as well as histograms of area coverage.
Figure 3B:
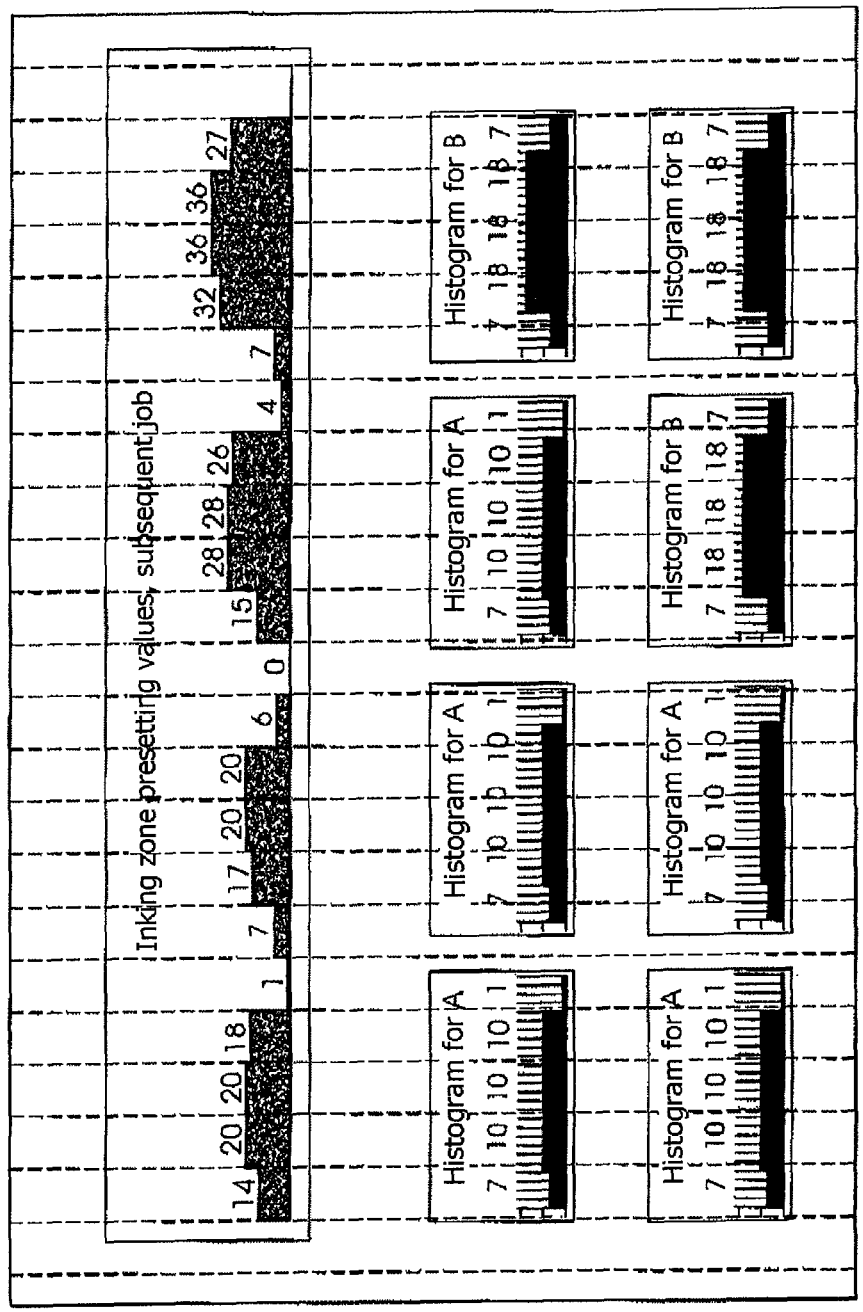

Merely by way of example for a better understanding of the invention, FIGS. 3A and 3B contain illustrations for the inking zones of the sheets 1 and 2, indicated by dash-dotted lines, from FIGS. 2A and 2B, specifying the percentage area coverage values and, in the outermost right-hand column beside them, the average which reproduces the total ink demand for the color separation.

Figure 1:
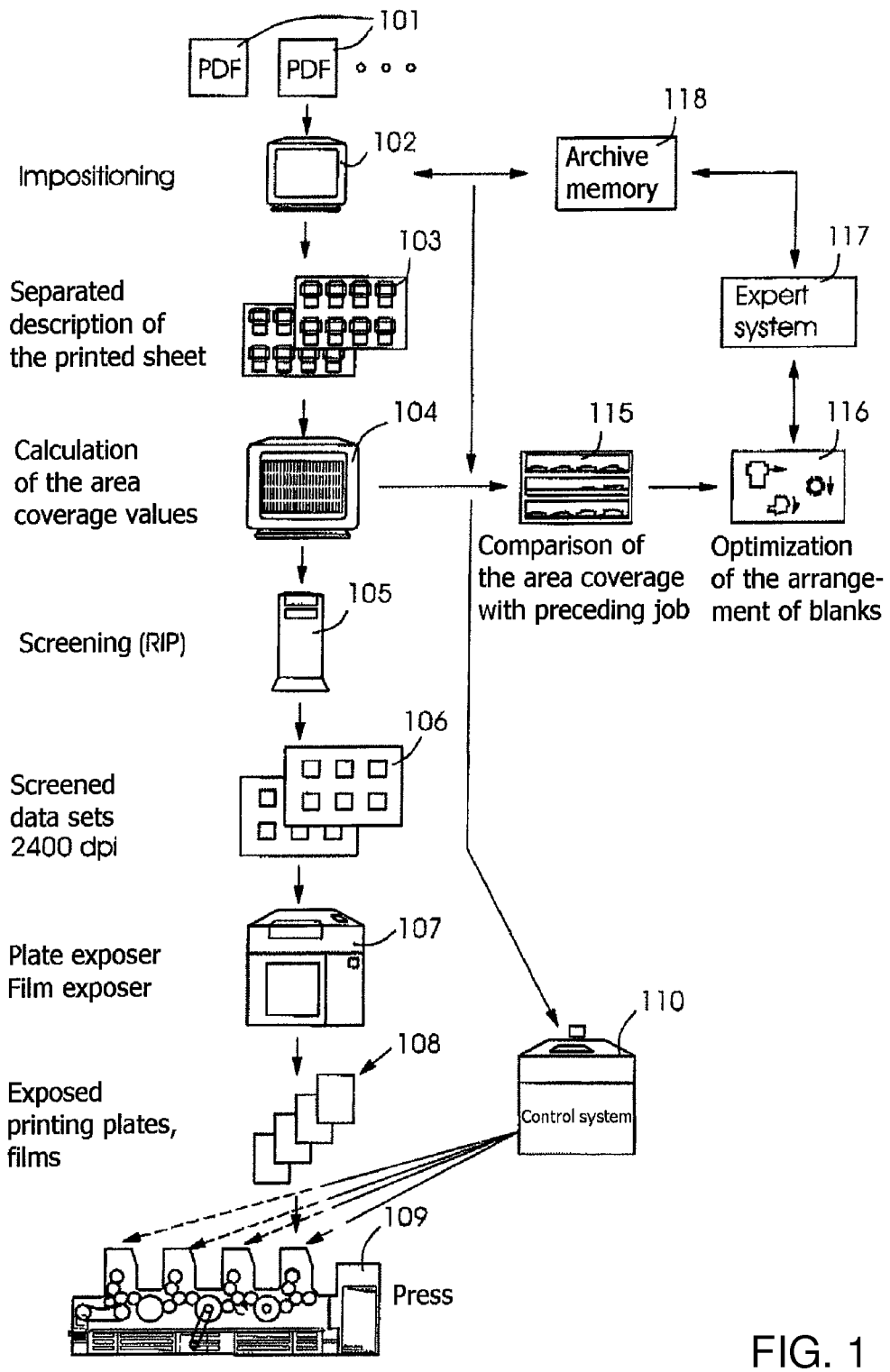
FIG. 1 is a flow chart illustrating the method according to the invention.

Now, before the printing plates for this print job are exposed, the values determined for the combined printing form according to FIG. 1 are compared for each color separation with those from the original job according to FIG. 2.

In the simplest case, this can be done through the use of a numerical comparison, by the values simply being written one above the other and underneath, as illustrated below, the difference Δ in the area coverage values being output:

| Sheet 1 | 0 | 14 | 20 | 20 | 18 | 1 | ... |
|---|---|---|---|---|---|---|---|
| Sheet 2 | 0 | 15 | 28 | 28 | 26 | 4 | ... |
| Δ | 0 | 1 | 8 | 8 | 8 | 3 | |

This difference Δ provides the decisive hint: specifically, if all the difference values for the inking zones of the two print jobs are zero or correspondingly small, which is to say lie below a predefined threshold value, printing of the combined printing form according to FIG. 2B will be carried out with virtually identical inking zone openings and no color differences with respect to the earlier original print job will arise in the case of the blanks of type A. If this is not the case, then in the next step the total ink demand, i.e. the integral area coverage for the color separations of the sheets from the two print jobs, are compared with each other. If the result of the comparison is that there are no excessively high deviations between the total area coverage for the color separations, an optimization program is started, the aim of which is to arrange the different blanks of type A and B on the sheet in such a way that the differences in the area coverage in the inking zones become as small as possible. In the other case, when the total area coverages of the two sheets according to FIG. 2A and FIG. 2B differ more sharply from each other, a warning is output and the operator carrying out the sheet impositioning is informed as to which other further blanks C, D, E . . . , likewise present in the database, are better suited for printing together with the blanks of type A than the blanks of type B from the point of view of total area demand.

During the optimization procedure mentioned above with the aim of minimizing the difference of the area coverage in the inking zones, the optimization software accesses the area coverages, stored for the blanks of type A and B, in the squares of the fine grid network stored with their coordinates and carries out various iterations. In this case, the individual blanks of type A and B are displaced relative to one another on the sheet and, overall, also rotated individually, of course always under the premise that the blanks must not touch or even overlap. In addition, the number of blanks of type B incorporated between the blanks of type A and vice versa can be changed in order to optimize the differences in the inking zone values if, to the benefit of color fidelity, a certain number of rejects due to the then not fully utilized area of the sheet are to be accepted.

In the relatively simple case of the two jobs illustrated in FIGS. 2A and 2B, the result of the comparison of the area coverage values from the original job according to FIG. 2A and the subsequent job according to FIG. 2B will be that, as a result of the blanks A and B printed one after another in the third column, which is to say in the case of blanks 5 and 6, relatively large differences in the area coverage occur, so that it would not be ensured that the blank A designated by reference numeral 5 would eventually bring about the same color impression as blanks 1 to 4 of type A disposed on the left-hand side. Although the area coverage of blanks 7 and 8 of type B on the right-hand side of the printing plate also differs considerably from the variation in the area coverage over the blanks A on the left-hand side, this does not (yet) play any role, since the printing of the blanks of type B is definitely a first-time job. Then, during iteration of the number of blanks, the optimization program would determine that optimal color fidelity may be achieved if, instead of the blank 5 of type A, a blank of type B were to be disposed there.

Figure 4:
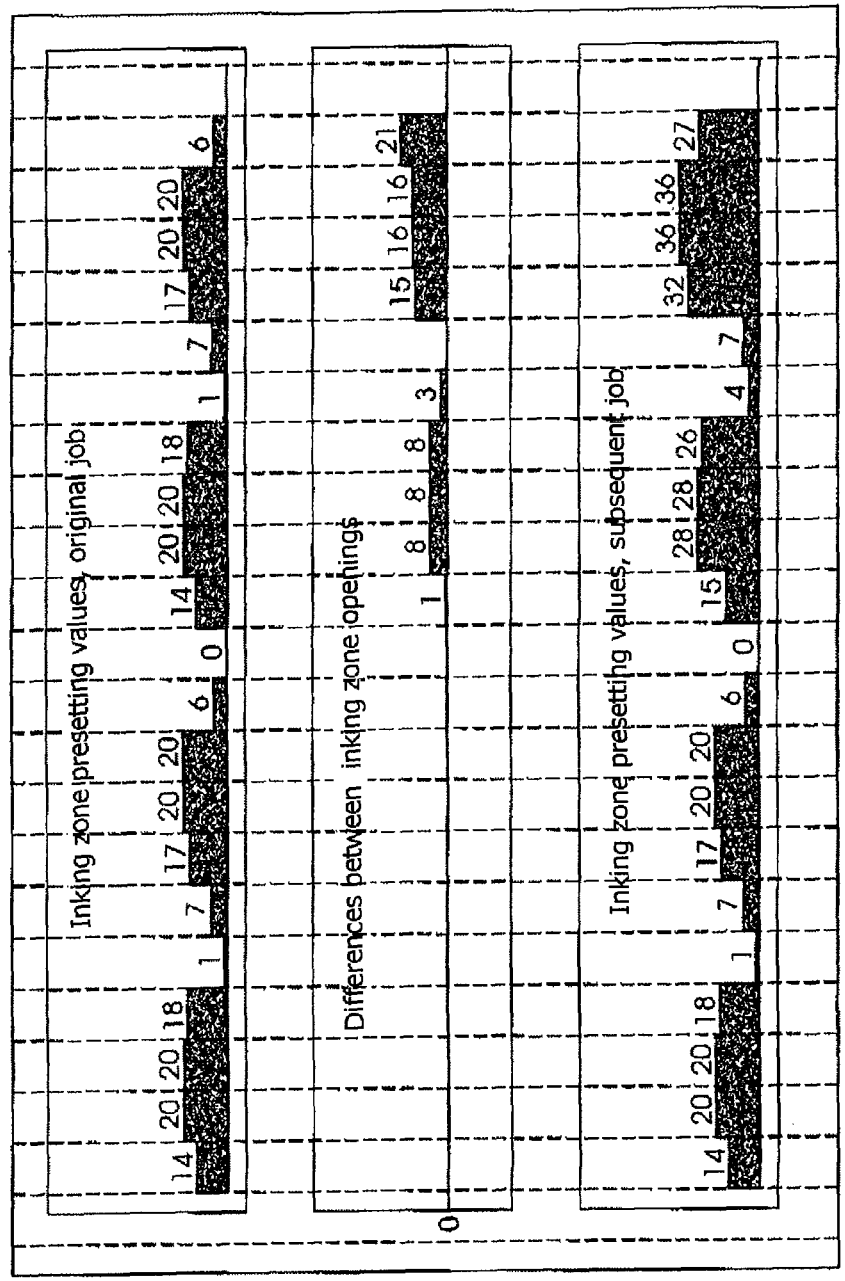
FIG. 4 is a graphical illustration of inking zone presetting values in an original job, differences between inking zone openings, and inking zone presetting values in a subsequent job.

Further and more convenient possibilities for comparing the area coverage values of the two jobs result from the display of histograms, as illustrated in FIGS. 3A and 3B, on a monitor. The integral inking zone presetting values of original job and subsequent job and also the difference between the inking zone values can additionally be displayed in pairs on a monitor, as illustrated in FIG. 4. On a second monitor, the geometric configuration of the blanks of type A and of type B on the sheet to be printed from the subsequent job can be seen, as illustrated in FIG. 2B, for example. Then, with the aid of an input instrument such as a mouse pointer, touch screen, etc., the operator can displace the configuration of the blanks A and B (FIG. 2B) on the monitor and, through the calculation described previously of the area coverages in the inking zones resulting from integration of the values from the squares of the fine grid, that operator obtains the corresponding inking zone openings of the two jobs compared with each other or as a difference in histogram form displayed in up-to-date form on a monitor according to FIG. 4. In this way, he or she can perform the coloring-relevant optimization interactively. An error message is generated if calculated area coverage values in individual color separations of a subsequent job differ from those of a preceding job by a predefined amount.

Another procedure at a higher level of automation resides in the operator being presented with the various geometric configurations of the blanks on the sheet for the optimized inking zone differences, for example increasing or decreasing, depending on the level of optimization, on the monitor according to FIG. 4, and in this way he or she is able to select the configuration which, with still tolerable difference values within the inking zones, offers him or her the best geometric configuration, for example from the point of view of print further processing.

It has now been shown that the method described above, depending on the assessment of the differences in the individual inking zones during the optimization of the configuration of the blanks, also places these different types one after another on the sheet in the sheet transport direction. However, this can be non-beneficial, since the order of blanks of different type placed in front and behind during printing can likewise lead to a visible change in the coloring, even if the differences in the inking zone openings are very small. For this reason, it may also be expedient to require a certain amount of constancy of the area coverage in the sheet transport or printing direction within an inking zone stripe or to incorporate it as a criterion in the comparison of original job and subsequent job. In this case, the procedure can then be such that the differences evaluated during the comparison of the area coverage values are assessed differently transversely with respect to the sheet transport direction, which is to say between the inking zones and in the sheet transport direction, i.e. within the inking zones, the basis in each case being that, during the assessment overall, the differences in the coloring of the blanks of type A between the two jobs is to remain below the limit perceptible by the human observer.

The method for producing the printing plate for the printing of the blanks on a sheet-fed press, for example, is illustrated once more in FIG. 1 in the form of a flow chart:

The blanks to be printed are present, for example, as PDF files 101 and, in the course of what is known as impositioning, are positioned on the printed sheet to be set electronically. If the blanks have not been set up afresh, they can also be retrieved from an archive/memory 118 from an impositioning operating position 102.

In the course of the impositioning, separated descriptions of a printed sheet 103, on which in each case a plurality of blanks, for example folding boxes, are disposed, are generated in the individual color separations.

Before the print job is then screened in a raster image processor 105, the configuration of the blanks is to be optimized as described above. To this end, in a computer 104, the area coverage values are determined from the separated description of the printed sheets 103, specifically firstly for an original job retrieved from the archive/memory 118 and for the subsequent job, on which different blanks have been disposed on the printing originals 103 of the printed sheet.

The histograms of the area coverage values for the two jobs can then be compared on a monitor of the computer 104. This step is designated 115. At the same time, the various blanks on the printed sheet can be optimized with regard to their configuration, number, and so on. This can be done in that, in an interactive process, as symbolized by a graphic 116, the number and position of the blanks can be displayed on the monitor of an impositioning computer 102. The two computers 102 and 104 can be combined into one operating station with a double monitor or a single monitor can also be used, on which the histograms in the illustration as at reference numeral 115 and/or the differences in the inking zone settings of original and subsequent job and also the configuration of the blanks with respect to their position are generated in various windows of a monitor as at reference numeral 116.

In this case, the computers 102 and 104 are connected to an expert system 117 from which, in conjunction with the blanks stored in the archive/memory 118 from further earlier print jobs, it is possible to find and suggest those which are most suitable to be printed together with the blanks primarily to be re-printed. A blank type not contained in the preceding job is replaced with one or more blanks of another type and area coverage values for a new combination of blanks on the sheet are compared with those from the preceding job.

After the best combination of the blanks for the sheets to be printed has been found, the print job is screened in the raster image processor 105 and screened data sets from color separations 106 are supplied with a resolution of typically 2440 dpi either to a plate exposer or film exposer 107, where the printing plates or films are exposed in the necessary, for example four-color, separations 108.

At the same time, in the computer 104, by using the area coverage values in the inking zones, the presetting data for the inking zones in the printing units of a printing press 109 are transferred to the control system 110 of the printing press. The control system sets zone screws in the machine and the printed sheets of the subsequent job can then be printed with the necessary color fidelity on the printing press 109.

The invention claimed is:

1. A method for printing combined jobs having different blanks for labels or folding boxes on a printed sheet, the method comprising the following steps:
    obtaining area coverage values or inking zone presetting values for printing presses, with which the blanks for labels or folding boxes are to be printed, from image data of the sheet to be printed;
    before printing, comparing the area coverage values or inking zone presetting values from an earlier print job with those from a subsequent print job, in which a number of blanks, configuration of blanks or type of at least one blank differs from a corresponding value from the earlier print job;
    changing the configuration of the blanks on the sheet, if a difference in the area coverage values or inking zone presetting values exceeds predefined values;
    screening image data of a print job with the changed configuration of the blanks; and
    printing sheets containing the blanks.

2. The method according to claim 1, which further comprises additionally determining area coverages for various types of blanks in a grid being smaller than dimensions of an inking zone, and storing the area coverages, for cells of the grid, together with position information about a respective grid cell.

3. The method according to claim 2, which further comprises storing or archiving the area coverage values and position information from the grid cells together with other data characterizing a respective type of the blank.

4. The method according to claim 3, wherein dimensions of the grid or squares are smaller than a width of an inking zone, at least by a factor of 10.

5. The method according to claim 1, which further comprises, before exposing a printing plate for a subsequent job, calculating area coverage values of color separations or inking zone openings of printing units for various configurations of the blanks of a combined printing form, for choosing configurations having smallest deviations between area coverage values in the inking zones of a preceding job and a subsequent job.

6. The method according to claim 5, which further comprises displaying the configurations of the blanks having the smallest deviations of the area coverage values, on a monitor.

7. The method according to claim 1, which further comprises generating an error message, if calculated area coverage values in individual color separations of a subsequent job differ from those of a preceding job by a predefined amount.

8. The method according to claim 7, which further comprises replacing a blank type not contained in the preceding job with one or more blanks of another type, and comparing area coverage values for a new combination of blanks on the sheet with those from the preceding job.

9. The method according to claim 8, which further comprises combining a plurality of different types of blanks one after another with a blank from a preceding job, calculating a most beneficial configuration of the blanks on the sheet with regard to smallest possible differences in area coverage values for each of the combinations, and storing and/or indicating or visualizing the most beneficial configurations as a suggestion.

10. The method according to claim 9, which further comprises storing area coverage values of various simulated configurations of different types of blanks on the printed sheet which have been calculated in a course of simulations and/or corresponding inking zone presetting values, in an expert database.

11. The method according to claim 1, which further comprises:
    displaying differences in area coverages in inking zones of a preceding job and a subsequent job as histograms;
    subdividing area coverages calculated for a preceding job and a subsequent job within an inking zone, specifically in a longitudinal direction of the inking zone, in a running direction of printing material;
    comparing partial area coverage values of mutually corresponding regions of the preceding job and of the subsequent job with one another; and
    using differences resulting from the comparing step as a further criterion during optimization of a configuration of the blanks on the sheet.

12. An installation for printing combined jobs having different blanks on a printed sheet to carry out the method according to claim 1, the installation comprising:
    a computer or workstation for processing image data;
    a program associated with said computer or workstation for determining area coverage values or inking zone presetting values from the image data;
    a comparison device connected to said computer or workstation for comparing area coverage values or inking zone presetting values of different combined jobs in color separations of the printed sheet with one another; and
    an expert system connected to said comparison device for optimizing a geometric configuration of the blanks of the combined job on the sheet.

13. An installation for printing combined jobs having different blanks on a printed sheet to carry out the method according to claim 1, the installation comprising:
    a computer or workstation for processing image data;
    a program associated with said computer or workstation for determining area coverage values or inking zone presetting values from the image data;
    a comparison device connected to said computer or workstation for comparing area coverage values or inking zone presetting values of different combined jobs in color separations of the printed sheet with one another;

a raster image processor connected to said computer or workstation for transforming the color separations of the printed sheet being changed with respect to a configuration of the blanks, into screened images;

a plate exposer connected to said raster image processor for exposing printing plates with screened color separations; and a printing press connected to said plate exposer for printing the combined job.

* * * * *